No. 880,751. PATENTED MAR. 3, 1908.
B. F. PARKER.
NUT LOCK.
APPLICATION FILED AUG. 19, 1907.
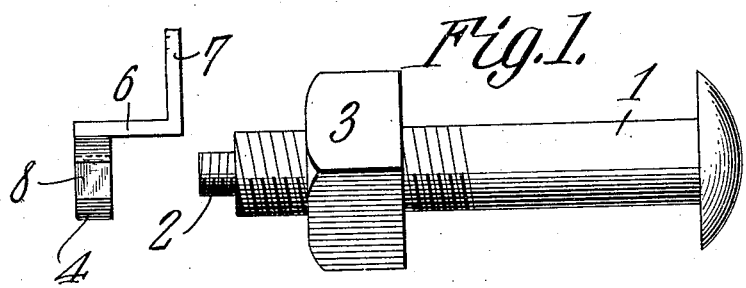
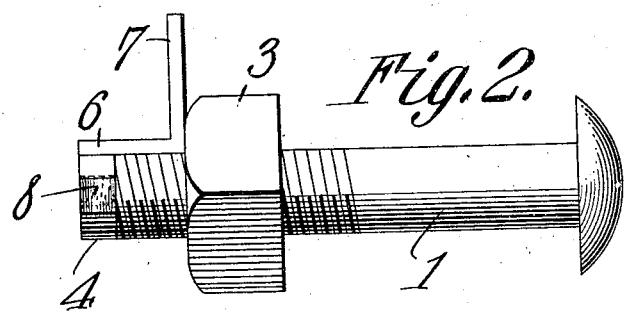
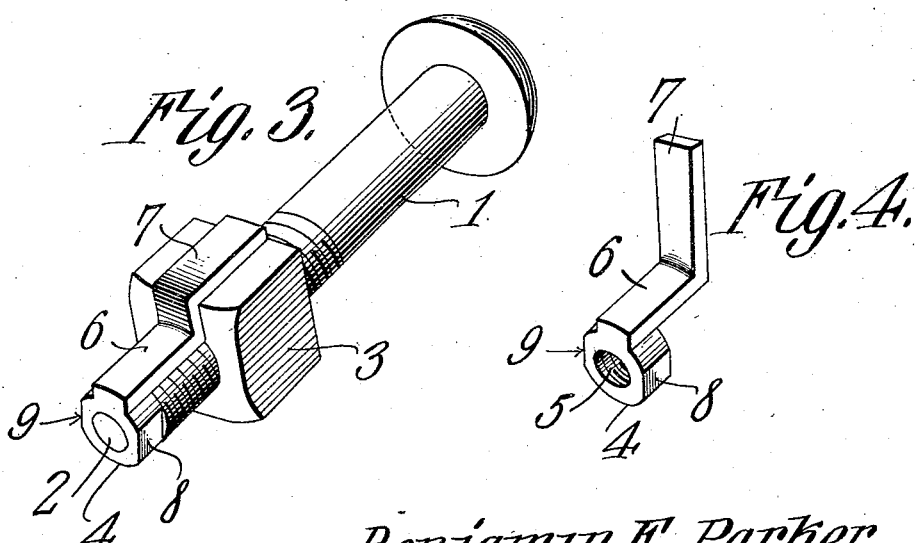
Benjamin F. Parker
Inventor

UNITED STATES PATENT OFFICE.

BENJAMIN F. PARKER, OF COWICHE, WASHINGTON.

NUT-LOCK.

No. 880,751.   Specification of Letters Patent.   Patented March 3, 1908.

Application filed August 19, 1907. Serial No. 389,268.

*To all whom it may concern:*

Be it known that I, BENJAMIN F. PARKER, a citizen of the United States, residing at Cowiche, in the county of Yakima and State of Washington, have invented a new and useful Nut-Lock, of which the following is a specification.

This invention relates to a device for fastening a nut on a bolt and prevent it turning in either direction.

The object of the invention is to provide a simple and safe lock for nuts which, when applied will prevent the nut from unscrewing and, in fact, prevent it rotating in either direction.

In the accompanying drawing:—Figure 1 is a side elevation of a bolt with a nut screwed on it with the lock about to be applied. Fig. 2 is a similar view with the lock applied but not fastened in place. Fig. 3 is a perspective view of a bolt, nut and lock, the latter in its completely fastened position. Fig. 4 is a perspective view of the lock detached.

Similar reference numerals are used for the same parts on all the figures.

The numeral 1 indicates a bolt having a rounded head and threaded stock of the ordinary form, but in addition thereto is a small stud 2 projecting axially from the end of the bolt and threaded in an opposite direction to the bolt. Screwed onto the bolt is a nut 3 which may be hexagonal, as in Figs. 1 and 2, or square, as shown in Fig. 3. A ring 4 of the same diameter as the bolt 1 and having a thickness equal to the length of the stud 2 has a central hole 5 threaded in the same direction as the stud and fitting thereon. Fastened to or integral with the peripheral surface of the ring 4 at some point is a horizontal arm 6 projecting its full thickness beyond the ring, a slight space, however, being left between said arm and the thread on the bolt 1 to permit the easy turning of the lock without interference. The arm 6 is made in various lengths, depending on the distance the bolt projects beyond the nut. Projecting perpendicularly from the end of the arm is a finger 7 which extends outwardly from the arm 6 at different distances depending on the thickness of the nut and other circumstances.

In use, after the bolt has been applied, and the nut screwed home as tightly as possible, the ring 4 is screwed on the stud in a direction opposite to that of the nut, until it is tight against the end of the bolt and the finger lies in close contact with the face of the nut. The finger 7 is long enough to project beyond the edge of the nut, as shown clearly in Fig. 2, which projecting end is turned or hammered down on the side of the nut, so that any attempt to unscrew the nut will be counteracted by the threaded ring 4. The opposite sides 8 and 9 of the ring 4 are flattened for the application of a tool to turn the ring.

Having described the invention what is claimed is:—

A nut lock comprising a bolt, a nut thereon, a stud projecting axially from the bolt and threaded in opposition to the bolt, and a lock consisting of a threaded ring engaging the stud, an arm projecting from one side of the ring and parallel with the bolt, and an outturned finger upon the arm and disposed to be turned down on the nut.

In testimony that I claim the foregoing as my own, I have hereto affixed my signature in the presence of two witnesses.

BENJAMIN F. PARKER.

Witnesses:
 JAMES E. DAVIS,
 WILLIAM A. STEWART.